US010452501B2

(12) United States Patent
Fang et al.

(10) Patent No.: US 10,452,501 B2
(45) Date of Patent: Oct. 22, 2019

(54) COPYING DATA FROM MIRRORED STORAGE TO AUXILIARY STORAGE ARRAYS CO-LOCATED WITH PRIMARY STORAGE ARRAYS

(71) Applicant: International Business Machines Corporation, Armonk, NY (US)

(72) Inventors: Min Fang, Shanghai (CN); Yang Liu, Shanghai (CN); Bo Zou, Hengda Garden (CN)

(73) Assignee: International Business Machines Corporation, Armonk, NY (US)

( * ) Notice: Subject to any disclaimer, the term of this patent is extended or adjusted under 35 U.S.C. 154(b) by 112 days.

(21) Appl. No.: 15/623,727

(22) Filed: Jun. 15, 2017

(65) Prior Publication Data
US 2018/0365115 A1   Dec. 20, 2018

(51) Int. Cl.
*G06F 11/00* (2006.01)
*G06F 11/20* (2006.01)

(52) U.S. Cl.
CPC ...... *G06F 11/2056* (2013.01); *G06F 11/2094* (2013.01); *G06F 11/2058* (2013.01); *G06F 2201/845* (2013.01)

(58) Field of Classification Search
CPC .......................... G06F 11/2056; G06F 11/2094
See application file for complete search history.

(56) References Cited

U.S. PATENT DOCUMENTS

| 6,324,654 | B1* | 11/2001 | Wahl | G06F 11/2066 |
|---|---|---|---|---|
| | | | | 707/999.202 |
| 7,260,739 | B2* | 8/2007 | Burton | G06F 11/2069 |
| | | | | 711/162 |
| 7,562,078 | B1* | 7/2009 | Yadav | G06F 16/10 |
| 7,761,426 | B2* | 7/2010 | Boyd | G06F 11/1471 |
| | | | | 707/655 |
| 9,128,973 | B1 | 9/2015 | Murugesan et al. | |
| 2004/0034808 | A1* | 2/2004 | Day, III | G06F 11/2058 |
| | | | | 714/6.23 |
| 2004/0153717 | A1* | 8/2004 | Duncan | G06F 11/2069 |
| | | | | 714/6.23 |
| 2004/0225914 | A1* | 11/2004 | Burton | G06F 11/2069 |
| | | | | 714/13 |
| 2004/0260873 | A1* | 12/2004 | Watanabe | G06F 11/2058 |
| | | | | 711/114 |
| 2005/0114741 | A1* | 5/2005 | Chen | G06F 11/0727 |
| | | | | 714/6.23 |

(Continued)

*Primary Examiner* — Marc Duncan
*Assistant Examiner* — Jonathan D Gibson
(74) *Attorney, Agent, or Firm* — Kunzler Bean & Adamson

(57) ABSTRACT

Methods that copy data from mirrored storage to auxiliary storage arrays co-located with primary storage arrays are provided. One method includes requesting a subset of the data from a backup system mirroring the set of data at a remote location in response to detecting an error in a storage device of an array of primary storage devices storing a set of data. The method further includes receiving the subset of the data from the backup system and storing the subset of the data in an array of auxiliary storage devices co-located with the array of primary storage devices in which the subset of the data can correspond to data stored on the storage device. Systems and computer program products for performing the above method are also provided.

18 Claims, 17 Drawing Sheets

(56) References Cited

U.S. PATENT DOCUMENTS

| | | | |
|---|---|---|---|
| 2005/0268054 A1* | 12/2005 | Werner | G06F 11/2069 |
| | | | 711/162 |
| 2006/0143497 A1* | 6/2006 | Zohar | G06F 11/2058 |
| | | | 714/6.23 |
| 2007/0130214 A1* | 6/2007 | Boyd | G06F 11/1471 |
| 2007/0168581 A1* | 7/2007 | Klein | G06F 11/201 |
| | | | 710/31 |
| 2007/0180309 A1* | 8/2007 | Zohar | G06F 11/2058 |
| | | | 714/6.12 |
| 2008/0307175 A1* | 12/2008 | Hart | G06F 11/1461 |
| | | | 711/162 |
| 2011/0252001 A1* | 10/2011 | Bensinger | G06F 11/2097 |
| | | | 707/658 |
| 2012/0136827 A1* | 5/2012 | Wang | G06F 11/1662 |
| | | | 707/623 |
| 2014/0344526 A1* | 11/2014 | Brown | G06F 11/1458 |
| | | | 711/141 |
| 2015/0169220 A1 | 6/2015 | Kondo | |
| 2015/0286545 A1* | 10/2015 | Brown | G06F 11/2058 |
| | | | 714/6.23 |
| 2016/0041880 A1 | 2/2016 | Mitkar et al. | |

\* cited by examiner

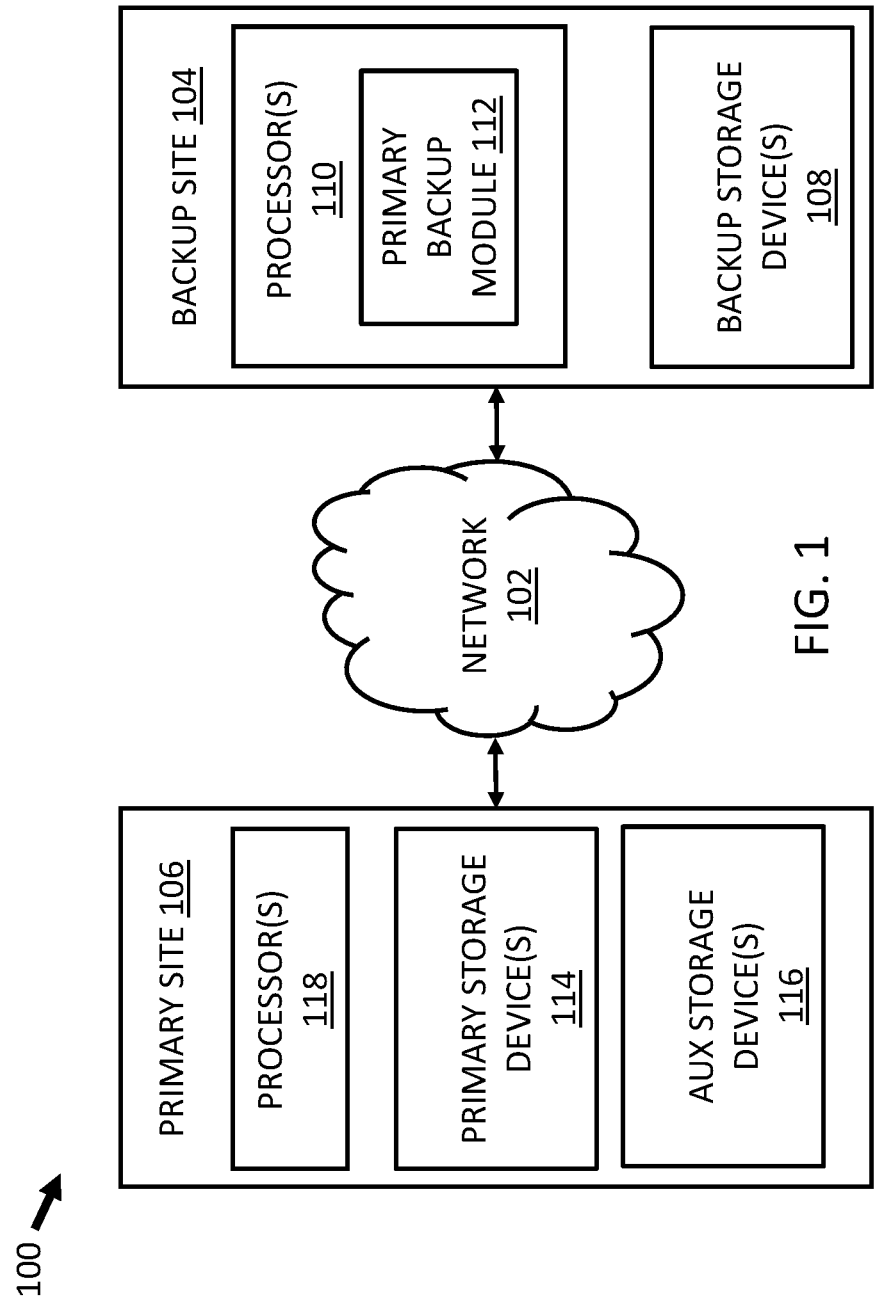

COPYING DATA FROM MIRRORED STORAGE TO AUXILIARY STORAGE ARRAYS CO-LOCATED WITH PRIMARY STORAGE ARRAYS

FIELD

The subject matter disclosed herein relates to storage networks and systems and, more particularly, relates to copying data from mirrored storage to auxiliary storage arrays co-located with primary storage arrays.

BACKGROUND

To prevent data loss, data is often copied or mirrored to one or more backup storage devices and/or systems. The backup storage device(s) or system(s) may be co-located with or remotely located from the primary storage device(s) and/or system(s).

Typically, mirrored data from the backup storage device(s) and/or system(s) is used to recover data when there is full array data loss on the primary storage device(s) and/or system(s). However, prior recovery techniques can be inefficient and/or inconvenient.

For instance, when a single array goes offline on the primary site, all the storage volumes in the same extent pool may become inaccessible. Further, prior recovery technique normally need to copy the entire extent data pool from a secondary site to primary site, which can create unnecessary latency because all the mirrored data is copied back to the primary site for recovery. Moreover, some users that have only a single array offline, may attempt every means possible and/or take high amounts of risk to bring the array back online in an effort to avoid the undue latency caused by restoring the data from backup.

Another issue that can cause recovery techniques to be inefficient and/or inconvenient occurs when a device in an array is experiencing one or more errors and is in the process of rebuilding and another device in the array reports one or more errors that may cause the entire array go offline in future and/or may cause the device rebuild take a substantial amount of time and/or increase the rebuild time. Here, having multiple devices experience errors and/or being rebuilt during an overlapping period of time can adversely impact the performance of a storage network and/or system. Accordingly, at least some previous storage networks may not be operating as efficiently and/or effectively as possible.

BRIEF SUMMARY

Methods and systems that copy data to auxiliary storage arrays co-located with primary storage arrays from mirrored storage are provided. One method includes requesting a subset of the data from a backup system mirroring the set of data at a remote location in response to detecting an error in a storage device of an array of primary storage devices storing a set of data. The method further includes receiving the subset of the data from the backup system and storing the subset of the data in an array of auxiliary storage devices co-located with the array of primary storage devices. In various embodiments, the subset of the data corresponds to data stored on the storage device.

A system includes a management module that manages an array of primary storage devices storing a set of data, an error detection module that detects errors in the array of primary storage devices, and a secondary backup module that requests backup data for subsets of the data from a primary backup module in response to the error detection module detecting errors in the array of primary storage devices. In some embodiments, a subset of the data corresponds to data stored on a storage device experiencing an error and/or at least a portion of said modules comprise one or more of a set of hardware circuits, a set of programmable hardware devices, and executable code stored on a set of computer-readable storage mediums.

Also disclosed are computer program products comprising a computer-readable storage medium including program instructions embodied therewith that copy data to auxiliary storage arrays co-located with primary storage arrays from mirrored storage. Some program instructions are executable by a processor and cause the processor to request a subset of the data from a backup system mirroring the set of data at a remote location in response to detecting an error in a storage device of an array of primary storage devices storing a set of data. The program instructions further cause the processor to receive the subset of the data from the backup system and store the subset of the data in an array of auxiliary storage devices co-located with the array of primary storage devices. In various embodiments, the subset of the data corresponds to data stored on the storage device.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which:

FIG. 1 is a diagram illustrating one embodiment of a storage system;

DETAILED DESCRIPTION

Figure 2A:
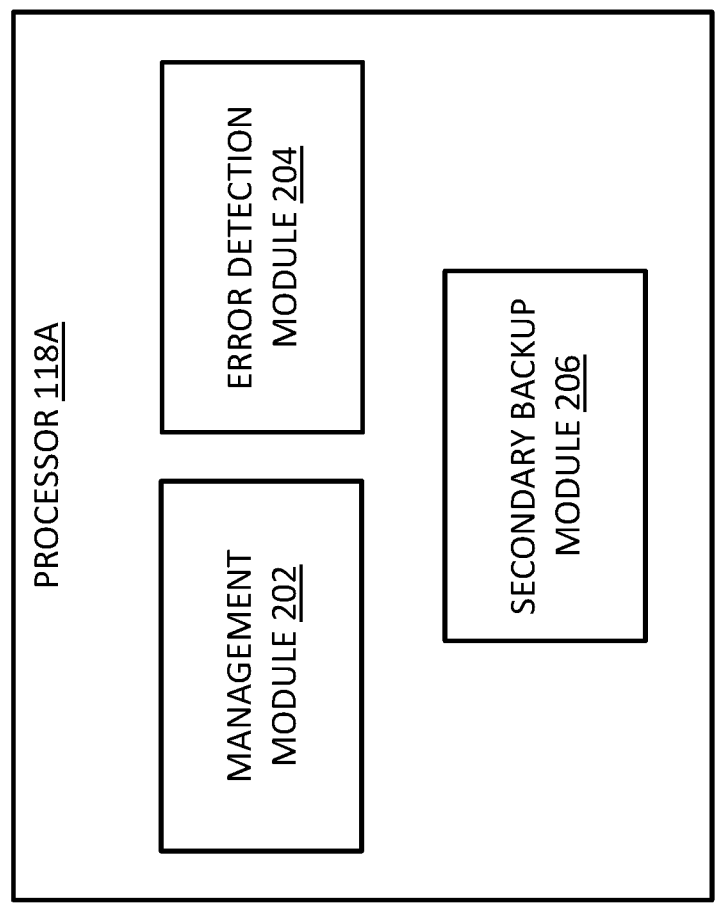
FIG. 2A is a block diagram illustrating one embodiment of a processor included in the storage system of FIG. 1.

Disclosed herein are various embodiments providing methods, systems, and computer program products that copy data to auxiliary storage arrays co-located with primary storage arrays from mirrored storage. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

A method that can copy data to auxiliary storage arrays co-located with primary storage arrays from mirrored storage includes requesting a subset of the data from a backup system mirroring the set of data at a remote location in response to detecting an error in a storage device of an array of primary storage devices storing a set of data. The method further includes receiving the subset of the data from the backup system and storing the subset of the data in an array of auxiliary storage devices co-located with the array of primary storage devices. In various embodiments, the subset of the data corresponds to data stored on the storage device and/or the array of primary storage devices and the array of auxiliary storage devices includes a same geometry.

In some embodiments, storing the subset of the data in the array of auxiliary storage devices includes storing the subset of the data in a second storage device of the array of auxiliary storage devices that corresponds to the first storage device of the array of primary storage devices. In additional or alternative embodiments, the method includes replacing the first storage device in the array of primary storage devices with the second storage device from the secondary array of storage devices.

A system includes a management module that manages an array of primary storage devices storing a set of data, an error detection module that detects errors in the array of primary storage devices, and a secondary backup module that requests backup data for subsets of the data from a primary backup module in response to the error detection module detecting errors in the array of primary storage devices. In some embodiments, a subset of the data corresponds to data stored on a storage device experiencing an error and/or at least a portion of said modules comprise one or more of a set of hardware circuits, a set of programmable hardware devices, and executable code stored on a set of computer-readable storage mediums.

In various embodiments, the system further includes a primary site comprising the array of primary storage devices and/or a processor including the management module, the error detection module, and the secondary backup module. The system, in some embodiments, further includes a secondary site comprising a secondary array of storage devices that mirror the set of data stored on the first set of storage devices and the primary backup module. Here, the primary backup module can manage the second set of storage devices and, in response to receiving, from the secondary backup module, a request for a subset of the data stored in a first storage device experiencing a first error, may transmit the subset of the data to the secondary backup module.

In additional or alternative embodiments, the system includes an array of auxiliary storage devices on the primary site in which the secondary backup module stores the subset of the data received from the primary backup module in the array of auxiliary storage devices. Here, the array of auxiliary storage devices may include the same geometry as the array of primary storage devices. Further, the error detection module can identify the first storage device as experiencing the first error and/or the secondary backup module stores the subset of the data on a second storage device in the array of auxiliary storage devices corresponding to the first storage device in the array of primary storage devices. In addition, a processor can further include a replacement module that replaces the first storage device in the array of primary storage devices with the second storage device in the array of auxiliary storage devices in response to the subset of the data being stored in the second storage device.

The system, in various embodiments, further includes a secondary array of storage devices located on a same site as the array of primary storage devices in which the secondary backup module stores a subset of the data received from the primary backup module in the secondary array of storage devices. In some embodiments, the primary backup module is located on a different site than the array of primary storage devices and the secondary array of storage devices. Further, the secondary array of storage devices can include the same geometry as the array of primary storage devices.

In some embodiments, the error detection module can identify a first storage device in the array of primary storage devices as experiencing a first error and/or the secondary backup module stores the subset of the data on a second storage device in the secondary array of storage devices corresponding to the first storage device in the array of primary storage devices. In additional and/or alternative embodiments, a processor can further include a replacement module that replaces the first storage device in the array of primary storage devices with the second storage device in the secondary array of storage devices in response to the subset of the data being stored in the second storage device.

Also disclosed are computer program products comprising a computer-readable storage medium including program instructions embodied therewith that copy data to auxiliary storage arrays co-located with primary storage arrays from mirrored storage. Some program instructions are executable by a processor and cause the processor to request a subset of the data from a backup system mirroring the set of data at a remote location in response to detecting an error in a storage device of an array of primary storage devices storing a set of data. The program instructions further cause the processor to receive the subset of the data from the backup system and store the subset of the data in an array of auxiliary storage devices co-located with the array of primary storage devices. In various embodiments, the subset of the data corresponds to data stored on the storage device and/or the array of primary storage devices and the array of auxiliary storage devices includes a same geometry.

In some embodiments, the program instructions that store the subset of the data in the array of auxiliary storage devices includes program instructions that store the subset of the data in a second storage device of the array of auxiliary storage devices that corresponds to the first storage device of the array of primary storage devices. In additional or alternative embodiments, the program instruction further include program instructions that cause the processor to replace the first storage device in the array of primary storage devices with the second storage device from the secondary array of storage devices.

With reference now to the figures, FIG. 1 is a diagram illustrating one embodiment of a storage system 100, which can also be considered a storage network. At least in the illustrated embodiment, the storage system 100 includes, among other components, a network 102 coupling a secondary or backup site 104 and a primary site 106 such that the backup site 104 and the primary site 106 are in communication and can share resources with one another.

The network 102 may be any suitable wired and/or wireless network 102 (e.g., public and/or private computer networks in any number and/or configuration (e.g., the Internet, an intranet, a cloud network, etc.)) that is known or developed in the future. In various embodiments, the network 102 can comprise a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources.

A backup site 104 may include any quantity and/or type of computing devices arranged in any topology that is known or developed in the future. At least in the illustrated embodiment, the backup site 104 comprises, among other components, a set of backup storage devices 108 and a set of processors 110 coupled to and in communication with one another.

The set of backup storage devices 108 (also simply referred individually, in various groups, or collectively as backup storage device(s) 108) may include any suitable type of storage device that is known or developed in the future that can store computer-useable data. In various embodiments, a backup storage device 108 may include one or more non-transitory computer-usable mediums (e.g., readable, writable, read-writable, etc.), which may include any non-transitory and/or persistent apparatus or device that can contain, store, communicate, propagate, and/or transport instructions, data, computer programs, software, code, routines, etc., for processing by or in connection with a computer processing device. A backup storage device 108, in further embodiments, may include non-transitory memory such as, for example, flash memory (e.g., a solid-state devices (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein.

In various embodiments, a backup storage device 108 may include non-volatile/persistent hardware and/or software configured to perform long-term data storage operations, including, but not limited to, data archiving, data backup, data mirroring, replicating data, etc. For instance, a backup storage device 108 may include non-volatile and/or persistent hardware and/or software to perform long-term data storage operations, which may include write operations, read operations, read-write operations, etc., among other operations.

The set of processors 110 (also simply referred individually, in various groups, or collectively as backup storage device(s) 110) may include any suitable computer processing device and/or system that is known or developed in the future that can perform input/output (I/O) operations (e.g., write operation, read operation, and/or read-write operation, etc.) on the storage device(s) 108 in response to receiving corresponding I/O requests (e.g., write request, read request, and/or read-write request, etc., respectively).

In some embodiments, a processor 110 includes a primary backup module 112 that receives requests to copy/mirror (e.g., a write request) a set of data from a data source and/or the primary site 106. In response thereto, the primary backup module 112 writes the set of data to one or more of the backup storage devices 108.

In additional or alternative embodiments, a primary backup module 112 receives a request to read (e.g., a read request) a subset of the data mirrored/copied on the set of storage devices 108 from a primary site 106. In response thereto, the primary backup module 112 transmits the subset of data to the primary site 106, as discussed elsewhere herein.

A primary site 106, at least in the illustrated embodiment, includes an array of primary storage devices 114, an array of auxiliary (AUX) storage devices 116, and a set of processors 118, among other components that are possible and contemplated herein. The array of primary storage devices 114 (also simply referred individually, in various groups, or collectively as primary storage device(s) 114) may include any suitable type of storage device that is known or developed in the future that can store computer-useable data. In various embodiments, a primary storage device 114 may include one or more non-transitory computer-usable mediums (e.g., readable, writable, read-writable, etc.), which may include any non-transitory and/or persistent apparatus or device that can contain, store, communicate, propagate, and/or transport instructions, data, computer programs, software, code, routines, etc., for processing by or in connection with a computer processing device. A primary storage device 114, in further embodiments, may include non-transitory memory such as, for example, flash memory (e.g., SSD or other non-volatile storage devices that store persistent data), a DRAM device, an EDRAM device, a SRAM device, a HDD, a near-line drive, tape drive (e.g., magnetic and/or virtual), and/or other type(s) (e.g., non-volatile and/or persistent) of memory devices, etc. that are possible and contemplated herein.

In various embodiments, a primary storage device 114 may include non-volatile/persistent hardware and/or software configured to perform long-term data storage operations, including, but not limited to, data archiving, data backup, data mirroring, replicating data, etc. For instance, a primary storage device 114 may include non-volatile and/or persistent hardware and/or software to perform long-term data storage operations, which may include write operations, read operations, read-write operations, etc., among other operations.

The array of auxiliary storage devices 116 (also simply referred individually, in various groups, or collectively as auxiliary storage device(s) 116) may include any suitable type of storage device that is known or developed in the future that can store computer-useable data. In various embodiments, an auxiliary storage device 116 may include one or more non-transitory computer-usable mediums (e.g., readable, writable, read-writable, etc.), which may include any non-transitory and/or persistent apparatus or device that can contain, store, communicate, propagate, and/or transport instructions, data, computer programs, software, code, routines, etc., for processing by or in connection with a computer processing device. An auxiliary storage device 116, in further embodiments, may include non-transitory memory such as, for example, flash memory (e.g., SSD or other non-volatile storage devices that store persistent data), a DRAM device, an EDRAM device, a SRAM device, a HDD, a near-line drive, tape drive (e.g., magnetic and/or virtual), and/or other type(s) (e.g., non-volatile and/or persistent) of memory devices, etc. that are possible and contemplated herein.

In various embodiments, an auxiliary storage device 116 may include non-volatile/persistent hardware and/or software configured to perform long-term data storage operations, including, but not limited to, data archiving, data backup, data mirroring, replicating data, etc. For instance, an auxiliary storage device 116 may include non-volatile and/or persistent hardware and/or software to perform long-term data storage operations, which may include write operations, read operations, read-write operations, etc., among other operations.

In some embodiments, an array of auxiliary storage devices 116 includes the same geometry and/or topology as an array of primary storage devices 114. Here, the array of auxiliary storage devices 116 can be considered a set of spare storage devices corresponding to the array of primary storage devices.

In various embodiments, at least a subset of the auxiliary storage devices 116 may be empty or do not store data at a given point in time. For instance, an auxiliary storage device 116 may be empty or not storing data while its corresponding primary storage device 114 is online and/or functioning properly. In situations in which a primary storage device 114 is offline and/or otherwise unavailable, the corresponding auxiliary storage device 116 may store a copy of mirrored data from a backup site 104, which mirrored data is a copy of the data stored in the primary storage device 114 that is offline and/or otherwise unavailable, as discussed elsewhere herein. That is, data stored in an auxiliary storage device 116 can be considered a copy of the copy of the data stored in a primary storage device 114 because the data in the auxiliary storage device 116 is a copy generated from mirrored data.

The processor(s) 118 may include hardware and/or software to copy data to auxiliary storage devices 116 co-located with primary storage devices 114 from mirrored storage (e.g., backup site 104). Referring now to FIG. 2A, one embodiment of a processor 118A including, among other components, a management module 202, an error detection module 204, and a secondary backup module 206 is illustrated.

In various embodiments, a management module 202 includes hardware and/or software that manages an array of primary storage devices 114. For instance, a management module 202 can manage the primary storage device(s) 114 by receiving I/O requests (e.g., read requests, write requests, read-write requests, etc.) and, in response thereto, performing corresponding I/O operations (e.g., read requests, write requests, read-write requests, etc., respectively) on the primary storage device(s) 114.

In some embodiments, a management module 202 may transmit data stored in the primary storage device(s) 114 to a backup site 104 so that a set of data in the primary storage device(s) is copied/mirrored at the backup site 104 (e.g., a mirrored copy of the data set in the backup storage device(s) 108). The data set may be synchronously or asynchronously copied/mirrored (e.g., written) to the backup site 104 as the data or a subset thereof is written/stored in the primary storage device(s) 114 at the primary site 106.

An error detection module 204, in various embodiments, includes hardware and/or software that detects errors in the primary storage device(s) 114. An error may be any type of error that is known or identified in the future. Examples of an error include, but are not limited to, device malfunctions, device failures, anticipated device failures (e.g., a failing device, a device that will/may fail in the future, etc.), a device going offline, damage to a device, device volume malfunctions, device volume failures, anticipated device volume failures (e.g., a failing volume, a volume that will/may fail in the future, etc.), a volume going offline, damage to a volume, error codes (e.g., Key Code Qualifiers (KCQs)), and/or device/volume latency issues, etc., among other types of error that are possible and contemplated herein.

In some embodiments, an error detection module 204 can identify a primary storage device 114 in an array of primary storage devices 114 that is experiencing an error. In additional or alternative embodiments, an error detection module 204 can identify a primary storage volume (e.g., a magnetic and/or virtual volume) in an array of primary storage volumes of a primary storage device 114 that is experiencing an error.

A secondary backup module 206, in various embodiments, includes hardware and/or software that requests backup/mirrored data from a backup site 104. Further, the secondary backup module 206 includes hardware and/or software that understands and/or knows that the array of primary storage device(s) 114 and the array of auxiliary storage device(s) 114 include the same geometry and/or topology and can correlate pairs of corresponding storage devices and/or storage volumes in the sets of primary storage devices 114 and auxiliary storage devices 118.

In various embodiments, a secondary backup module 206 requests subsets of the data that is stored (e.g., mirrored/copied) in the backup storage device(s) 108 in response to an error detection module detecting errors in the array of primary storage devices 114. For example, in response to an error detection module 204 identifying/determining that a particular primary storage device 114 is experiencing an error, a secondary backup module 206 will request that the backup site 104 (e.g., processor(s) 110) transmit a subset of the data stored (copied/mirrored) in the backup storage device(s) 108 that corresponds to the data stored in the particular primary storage device 114 that is experiencing the detected error be transmitted to the primary storage site 106. In response to receipt of the mirrored subset of data (e.g., the mirrored data corresponding to the data stored in the primary storage device 114 that is experiencing the error), a secondary backup module 206 will write (e.g., store, copy, mirror, etc.) the subset of the mirrored data to an auxiliary storage device 116 in the array of auxiliary storage devices 116 that corresponds to the primary storage device 114 that is experiencing the error in the array of primary storage devices 114.

In another non-limiting example, in response to an error detection module 204 identifying/determining that a particular storage volume in an array of storage volumes on a primary storage device 114 is experiencing an error, a secondary backup module 206 will request that the backup site 104 (e.g., processor(s) 110) transmit a subset of the data stored (copied/mirrored) in the backup storage device(s) 108 that corresponds to the data stored in the particular storage volume that is experiencing the detected error be transmitted to the primary storage site 106. In response to receipt of the mirrored subset of data (e.g., the mirrored data corresponding to the data stored in the storage volume that is experiencing the error), a secondary backup module 206 will write (e.g., store, copy, mirror, etc.) the subset of the mirrored data to a pseudo or auxiliary storage volume in the array of auxiliary storage devices 116 that corresponds to the storage volume that is experiencing the error.

In some embodiments, a secondary backup module 206 requests data that is stored (e.g., mirrored/copied) in the backup storage device(s) 108 in response to an error detection module detecting errors in the array of primary storage devices 114. For example, in response to an error detection module 204 identifying/determining that a particular primary storage device 114 is experiencing an error, a secondary backup module 206 will request that the backup site 104 (e.g., processor(s) 110) transmit the data stored (copied/mirrored) in the backup storage device(s) 108 and the backup site 104 will transmit the full mirrored set of data stored on the backup site 104. In response to receipt of the full mirrored set of data, a secondary backup module 206 will write (e.g., store, copy, mirror, etc.) the full set of mirrored data to the array of auxiliary storage devices 116. Here, the auxiliary device 116 that corresponds to the to the primary storage device 114 that is experiencing the error will have the subset of the mirrored data that corresponds to the data in the primary storage device 114 that is experiencing the error written to it. Further, the remaining mirrored data in the full set of mirrored data that was transmitted from the backup site 104 that corresponds to the primary storage device(s) 114 that are functioning properly and/or are not experiencing an error may not be written to the primary site 106, any of the auxiliary devices 116 and/or any of the primary devices 116 (e.g., a no operation, non-operation, etc.). In this manner, the backup site 104 may be unaware which mirrored data (or subset of mirrored data) is being copied to the primary site 106 and/or primary storage device 114, which primary storage device 114 is experiencing an error, and/or which auxiliary device 116 is receiving the copy of the mirrored data/mirrored data subset.

In a further non-limiting example, in response to an error detection module 204 identifying/determining that a particular storage volume in an array of storage volumes on a primary storage device 114 is experiencing an error, a secondary backup module 206 will request that the backup site 104 (e.g., processor(s) 110) transmit the data stored (copied/mirrored) in a sub-range of storage volumes that correspond to the data in the array of auxiliary storage devices 116 in the backup storage device(s) 108 and the backup site 104 will transmit the subset of data stored on the sub-range of storage volumes. In response to receipt of the subset of data, a secondary backup module 206 will write (e.g., store, copy, mirror, etc.) the subset of mirrored data to one or more storage volumes in the primary storage device(s) 114 and an auxiliary storage volume in an auxiliary storage device 116 that corresponds to the storage volume that is experiencing the error will have the mirrored data that corresponds to the data in the storage volume that is experiencing the error written to it. Further, the remaining mirrored data in the set of mirrored data that was transmitted from the backup site 104 that corresponds to the storage volume(s) that are functioning properly and/or are not experiencing an error may not be written to the primary site 106, any of the storage volumes in the auxiliary device(s) 116 and/or any of the storage volumes in the primary device(s) 116 (e.g., a no operation, non-operation, etc.). In this manner, the backup site 104 may be unaware which mirrored data (or subset of mirrored data) is being copied to the primary site 106, primary storage device 114, and/or storage volume, which primary storage device 114 is experiencing an error, and/or which auxiliary device 116 is receiving the copy of the mirrored data/mirrored data subset.

The embodiments discussed in the above examples may provide several advantages and/or improvements over conventional storage and/or recovery techniques. For instance, some embodiments in which the backup site transmits an identified subset of the mirrored data can increase efficiency and/or can eliminate or at least reduce the amount of time or latency issues associated with copying data due to difference in the time it takes to transmit a subset of the mirrored data compared to the time it takes to transmit a full copy of the mirrored data. Further, some embodiments in which the full copy of the mirrored data can increase efficiency and/or accuracy due to the ease it requesting a data copy since a specific subset and/or amount of data may not be identified and/or it can be simpler to implement full copy writes compared to copying a subset of the mirrored data. While some advantages are identified and discussed herein, the various embodiments are limited to such advantages and/or improvements, but rather, the various embodiments contemplate all of the possible advantages and/or improvements that can be provided by the various embodiments.

Figure 2B:
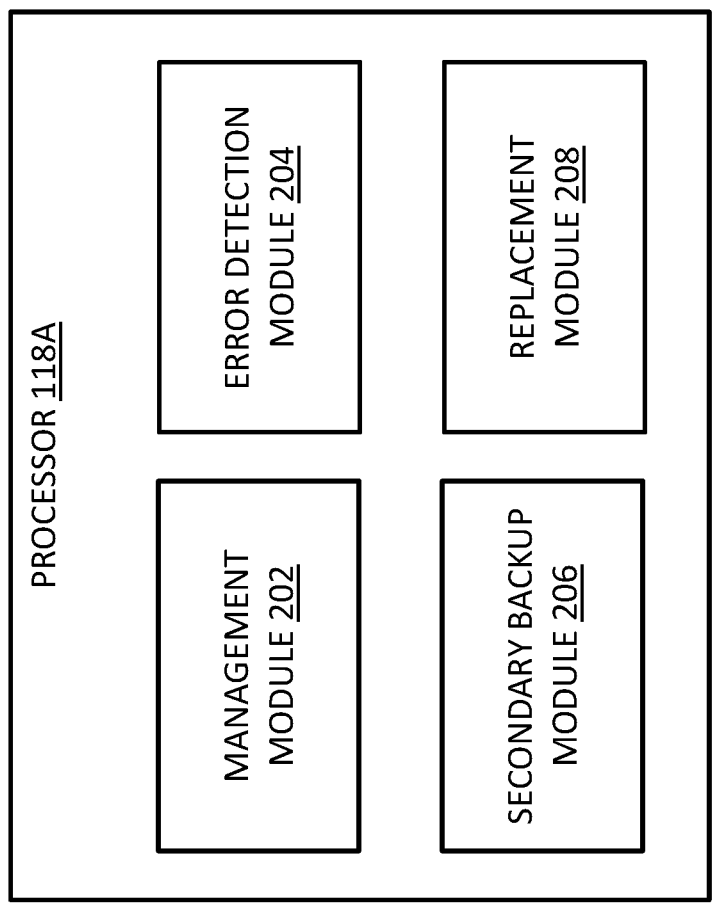
FIG. 2B is a block diagram illustrating another embodiment of a processor included in the storage system of FIG. 1.

Referring to FIG. 2B, FIG. 2B is a block diagram of another embodiment of a processor 118B. At least in the illustrated embodiment, the processor 118B includes, among other components, a management module 202, an error detection module 204, and a secondary backup module 206 similar to the processor 118A of FIG. 2A and further includes a replacement module 208.

A replacement module 208, in various embodiments, includes hardware and/or software that replaces primary storage devices 114 and/or storage volumes on a primary storage device 114 that are experiencing one or more errors. The hardware and/or software can also replace primary storage devices 114 and/or storage volumes that are in the process of being rebuilt.

In some embodiments in which an array of auxiliary storage devices 118 includes the same geometry and/or topology as an array of primary storage devices 114, a replacement module 208 replaces primary storage devices 114 in the array of primary storage devices 114 with corresponding auxiliary storage devices 116 in the array of auxiliary storage devices 116. The replacement module 208 can replace multiple primary storage devices 114 in an array of storage devices 114 in parallel (e.g., at the same or at substantially the same time) and/or in series (e.g., in succession, in a sequence, etc.).

In additional or alternative embodiments in which an array of auxiliary storage devices 118 includes the same geometry and/or topology as an array of primary storage devices 114, a replacement module 208 replaces storage volumes 114 in a primary storage device 114 with corresponding auxiliary storage volumes in an auxiliary storage device 116. The replacement module 208 can replace multiple storage volumes in the primary storage device 114 in parallel (e.g., at the same or at substantially the same time) and/or in series (e.g., in succession, in a sequence, etc.).

A replacement module 208, in some embodiments, can replace primary storage devices 114 with corresponding auxiliary storage devices 116 and storage volumes in primary storage devices 114 with corresponding auxiliary storage volumes in corresponding auxiliary storage devices 116. For instance, the replacement module 208 can replace, in parallel and/or in series, multiple primary storage devices 114, multiple storage volumes, a primary storage device 114 and a storage volume, multiple primary storage devices 114 and a storage volume, a primary storage device 114 and multiple storage volumes, and/or multiple primary storage devices and multiple storage volumes.

In additional or alternative embodiments, a replacement module 208 can replace multiple arrays of primary storage devices 114 with multiple corresponding arrays of auxiliary storage devices 116. The arrays of primary storage devices 114 may be replaced in parallel and/or in series. Further, a replacement module 208 can replace one or more storage volumes in one or more primary storage devices 114 of the arrays of primary storage devices 114 and/or one or more primary storage devices 114 in the arrays of primary storage devices 114 in parallel and/or in series.

For instance, a replacement module 208 can replace one or more storage volumes in the same, different, and/or multiple primary storage devices 114 in the same, different, and/or multiple arrays of primary storage devices in parallel and/or in series. Further, a replacement module 208 can replace one or more primary storage devices 114 in the same, different, and/or multiple arrays of storage devices 114 in parallel and/or in series. Moreover, a replacement module 208 can replace one or more arrays of storage devices 114 in parallel and/or in series.

Figure 3A:
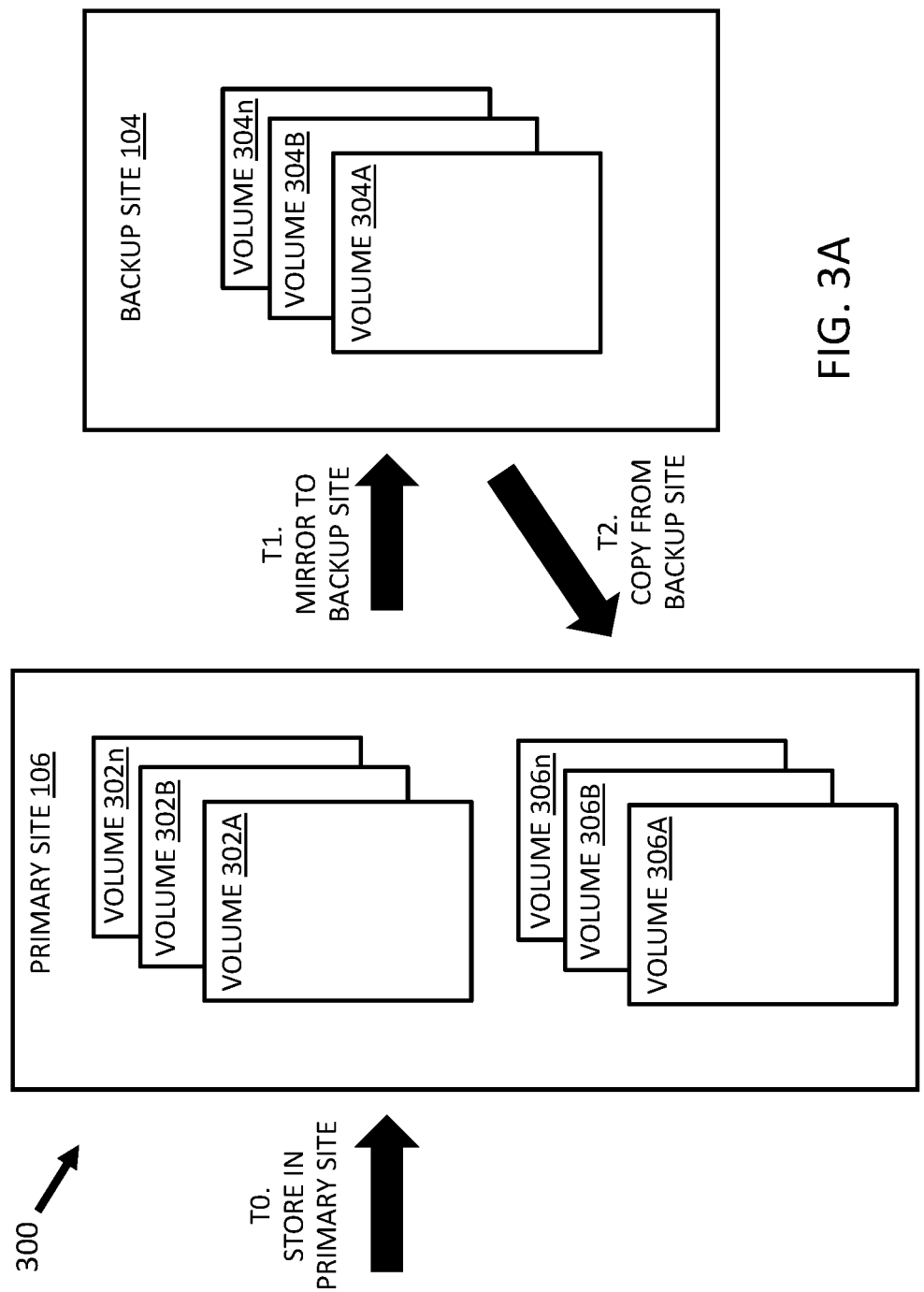
FIG. 3A is a block diagram illustrating one embodiment of a timing diagram for storing data in a primary site and a backup site.

FIG. 3A illustrates one embodiment of a timing diagram 300 for storing data in a primary site 106 and a backup site 104. At least in the illustrated embodiment, a set of data is stored in volumes 302A, 302B, . . . 302n (simply referred individually, in various groups, or collectively as primary volume(s) 302 or primary storage volume(s) 302) on the primary site 106 (T0).

The primary volumes 302 may be synchronously and/or asynchronously mirrored/copied to the backup site 104 (T1) to create volumes 304A, 304B, . . . 304n (simply referred individually, in various groups, or collectively as backup volume(s) 304 or backup storage volume(s) 304). The backup volume(s) 304 are copied/mirrored back to the primary site 106 (T2) to create volumes 306A, 306B, . . . 306n (simply referred individually, in various groups, or collectively as auxiliary volume(s) 306 or auxiliary storage volume(s) 306).

Figure 3B:
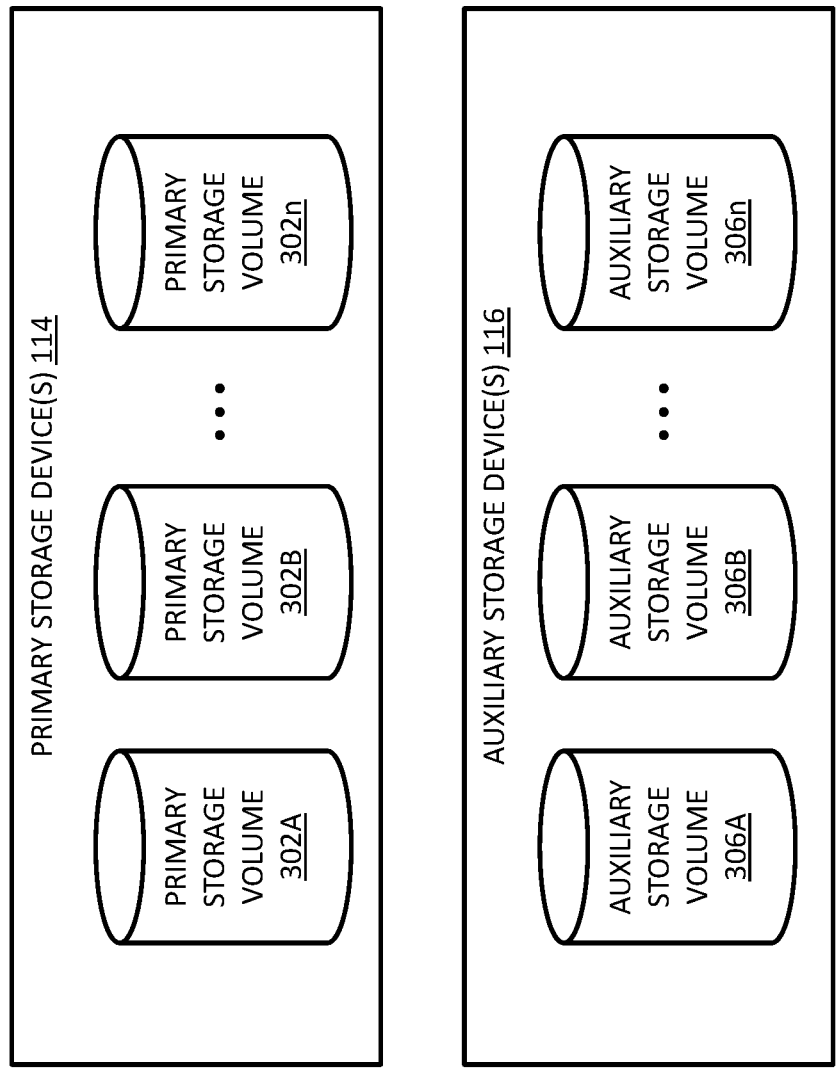
FIG. 3B is a diagram illustrating an embodiment of an auxiliary storage array including the same geometry and/or topology as a corresponding primary storage array.

The backup volume(s) 304 may include the same geometry and/or topology as the primary volume(s) 302 and, in some embodiments, can include a different geometry and/or topology than the primary volume(s) 302 (and the auxiliary volume(s) 306). As shown in FIG. 3B, the auxiliary volume(s) 306 include the same geometry and/or topology as the primary volume(s) 302 and can be considered one or more spare volumes for the primary volume(s) 302.

Figure 4:
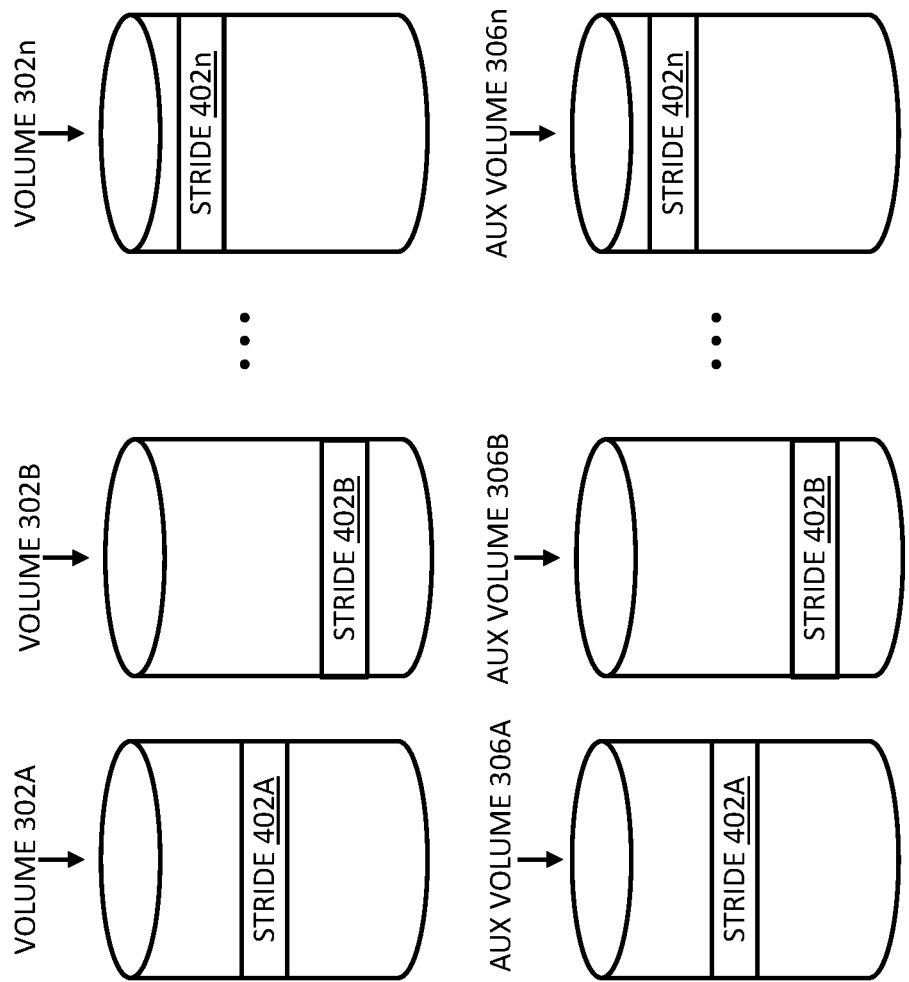
FIG. 4 is a diagram illustrating another embodiment of an auxiliary storage array including the same geometry and/or topology as a corresponding primary storage array.

As further shown in FIG. 4, the corresponding pairs of volume 302/auxiliary volume 306 include the same strides 400A, 400B, . . . 400n (simply referred individually, in various groups, or collectively as stride(s) 400). As shown, the corresponding strides 400 are stored in corresponding storage locations in each volume 302/auxiliary volume 306 pair.

Figure 5A:
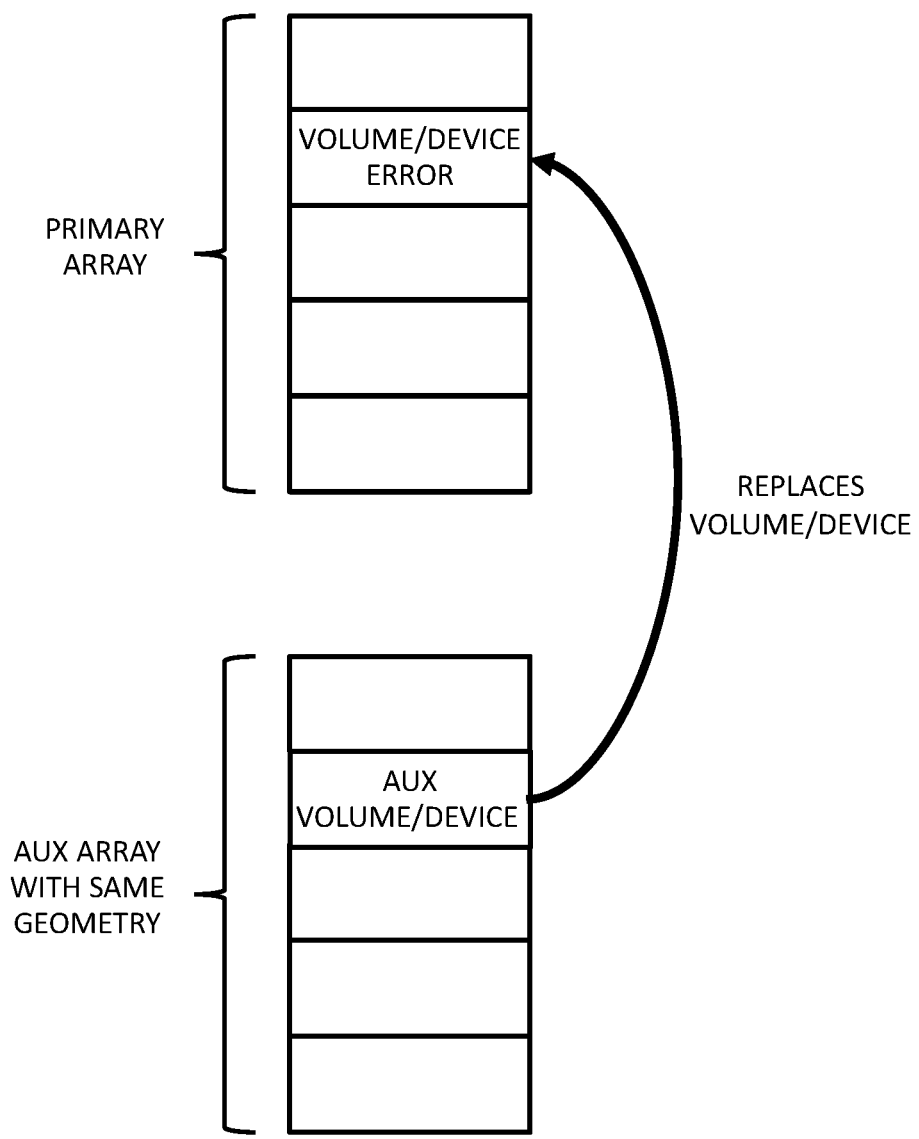
FIGS. 5A through 5I are diagram illustrating various embodiments of operations for replacing primary storage volumes and/or primary storage devices with corresponding auxiliary storage volumes and/or auxiliary storage devices in one or more primary arrays.

Referring now to FIGS. 5A through 5I, FIGS. 5A through 5I illustrate various non-limiting examples of replacing primary storage volumes 302 and/or primary storage devices 114 in accordance with various embodiments discussed herein. In FIG. 5A, a replacement module 208 replaces a volume 302 or primary storage device 114 (with the volume 302) in a primary array 302/114 with a corresponding auxiliary volume 306 or auxiliary storage device 116 in an auxiliary array 306/116.

The volume 302 or primary storage device 114 is replaced in response to an error detection module 204 detecting/determining an error in the volume 302 and/or primary storage device 114. Further, the volume 302 or primary storage device 114 is replaced subsequent to a secondary backup module 206 requesting and receiving a mirrored copy of the data stored in the volume 302 or primary storage device 114 from a backup site 104. The error may be any type of error that a volume 302 and/or primary storage device 114 can experience and be detected by an error detection module 208, as discussed elsewhere herein.

Figure 5B:
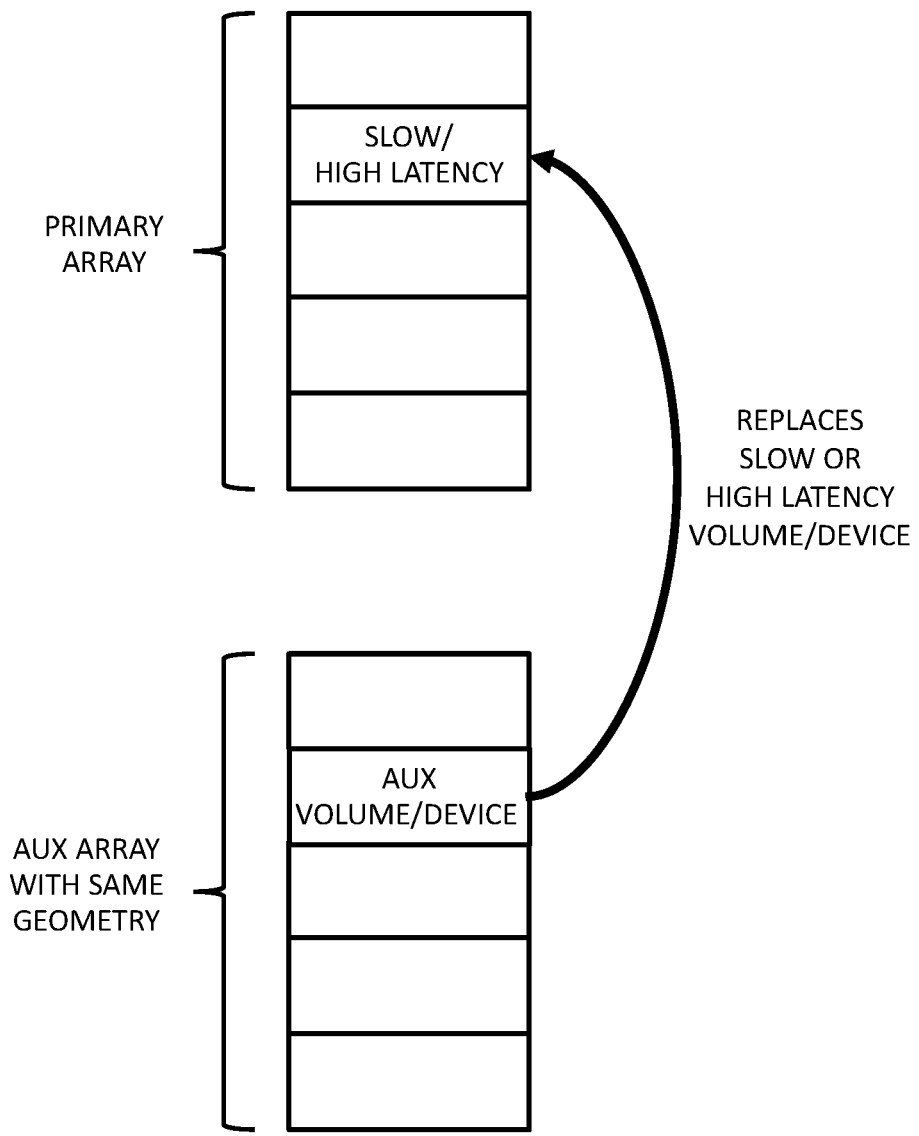

The example illustrated in FIG. 5B is similar to the example illustrated in FIG. 5A, but illustrates one type of error that can be experienced by a volume 302 or primary storage device 114. In the illustrated embodiment, replacement is initiated by a replacement module 208 in response to an error detection module 204 detecting/determining a latency error (e.g., the volume 302 or primary storage device 114 is slow, has stopped, is experiencing a high amount of latency, etc.) in the volume 302 or primary storage device 114. A latency error may be based on any suitable time and/or operations metric including, for example, I/O operations per second (TOPS). Further, the replacement module 208 replaces the volume 302 or primary storage device 114 subsequent to a secondary backup module 206 requesting and receiving a mirrored copy of the data stored in the volume(s) 302 or primary storage device(s) 114 from a backup site 104.

Figure 5C:
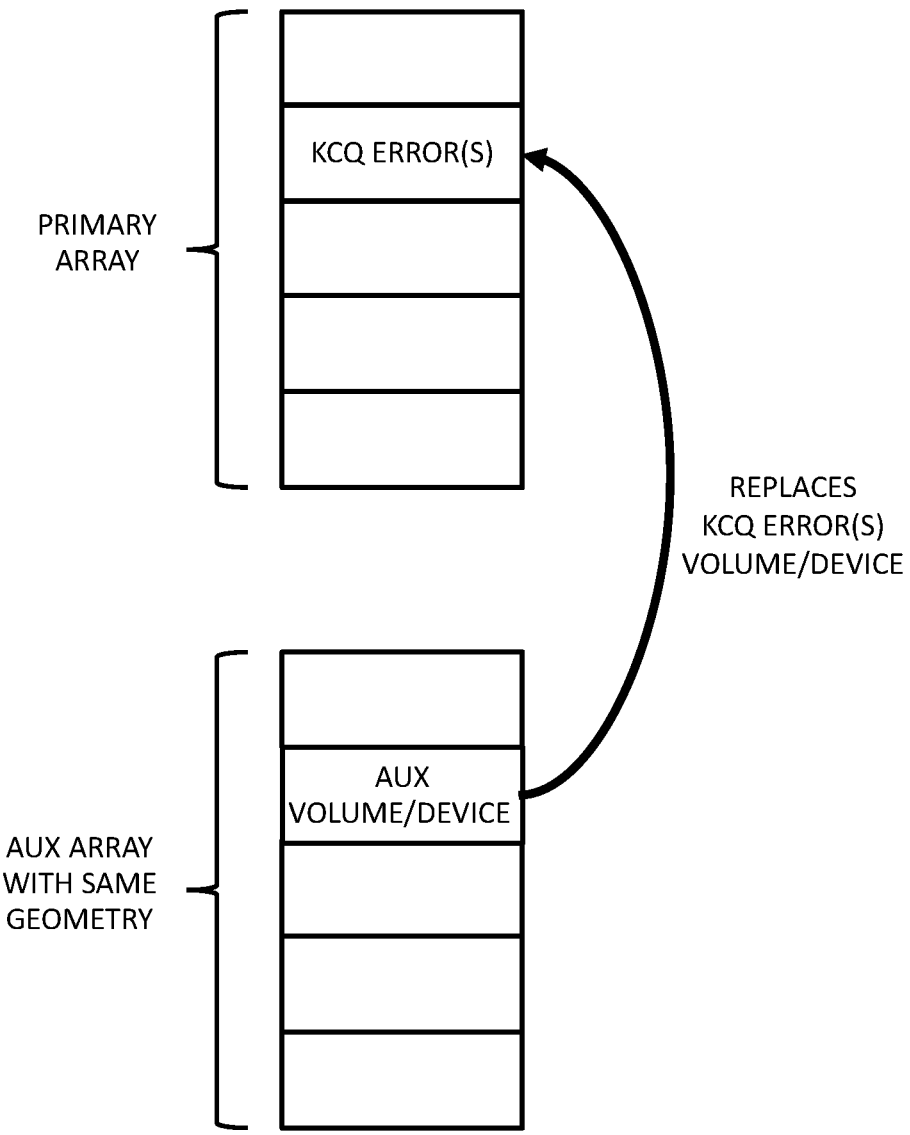

The example shown in FIG. 5C is similar to the example illustrated in FIG. 5B, but illustrates a different type of error that can be experienced by a volume 302 or primary storage device 114. In FIG. 5C, the error being experienced by the volume 302 or primary storage device 114 is one or more errors that result in the generation of one or more error codes (e.g., KCQ codes, etc.) and/or the generation of greater than a predetermined quantity of error codes.

Figure 5D:
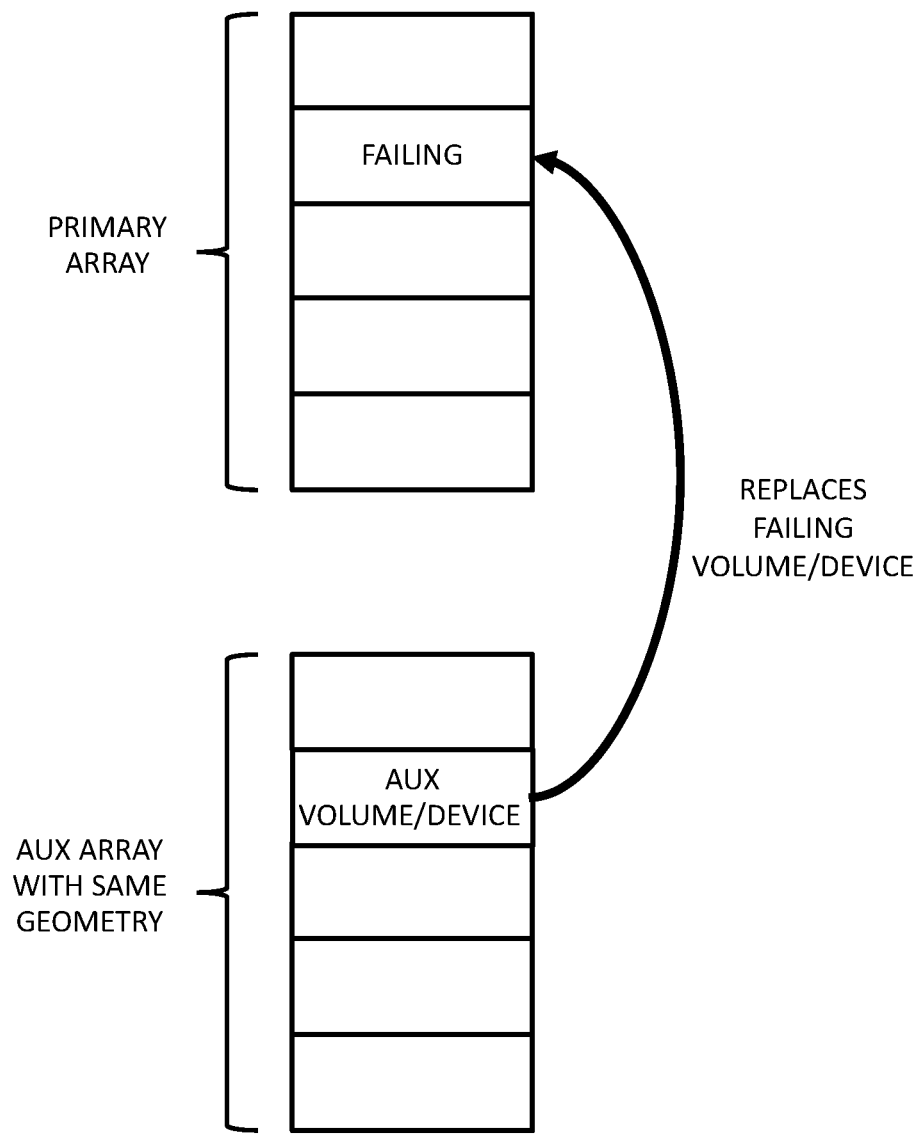

FIG. 5D illustrates an example that is similar to the examples illustrated in FIGS. 5B and 5C, but illustrates a different type of error that can be experienced by a volume 302 or primary storage device 114. In FIG. 5D, the error being experienced by the volume 302 or primary storage device 114 is an error detection module 208 detecting that the volume 302 or primary storage device 114 is failing and/or will fail in the future. Here, the error detection module 208 can determine that the volume 302 or primary storage device 114 is failing or will fail shortly utilizing any technique and/or process that is known or developed in the future.

Figure 5E:
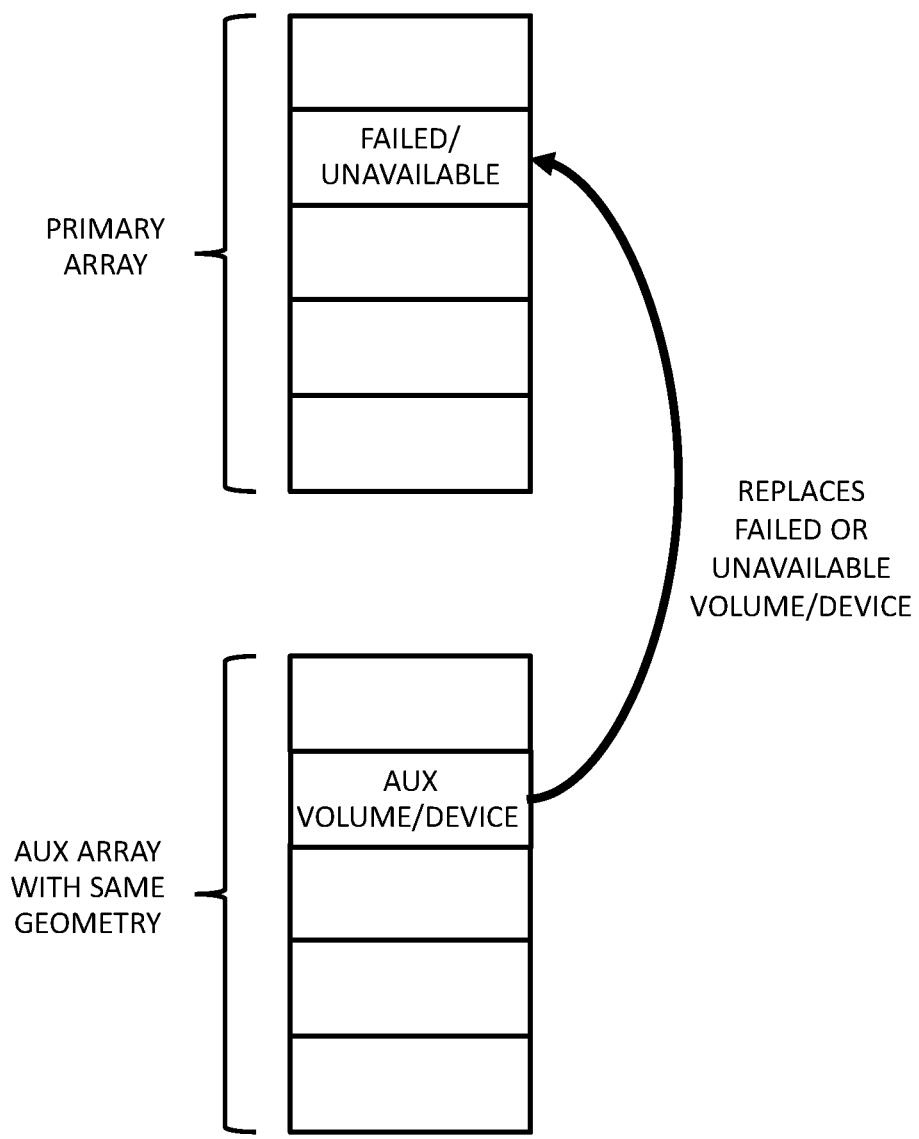

The example shown in FIG. 5E is similar to the examples illustrated in FIGS. 5B through 5D, but illustrates a different type of error that can be experienced by a volume 302 or primary storage device 114. In FIG. 5E, the error being experienced by the volume 302 or primary storage device 114 is a device failure or otherwise becoming unavailable. The error detection module 208 can determine that the volume 302 or primary storage device 114 has failed or is otherwise unavailable utilizing any technique and/or process that is known or developed in the future.

Figure 5F:
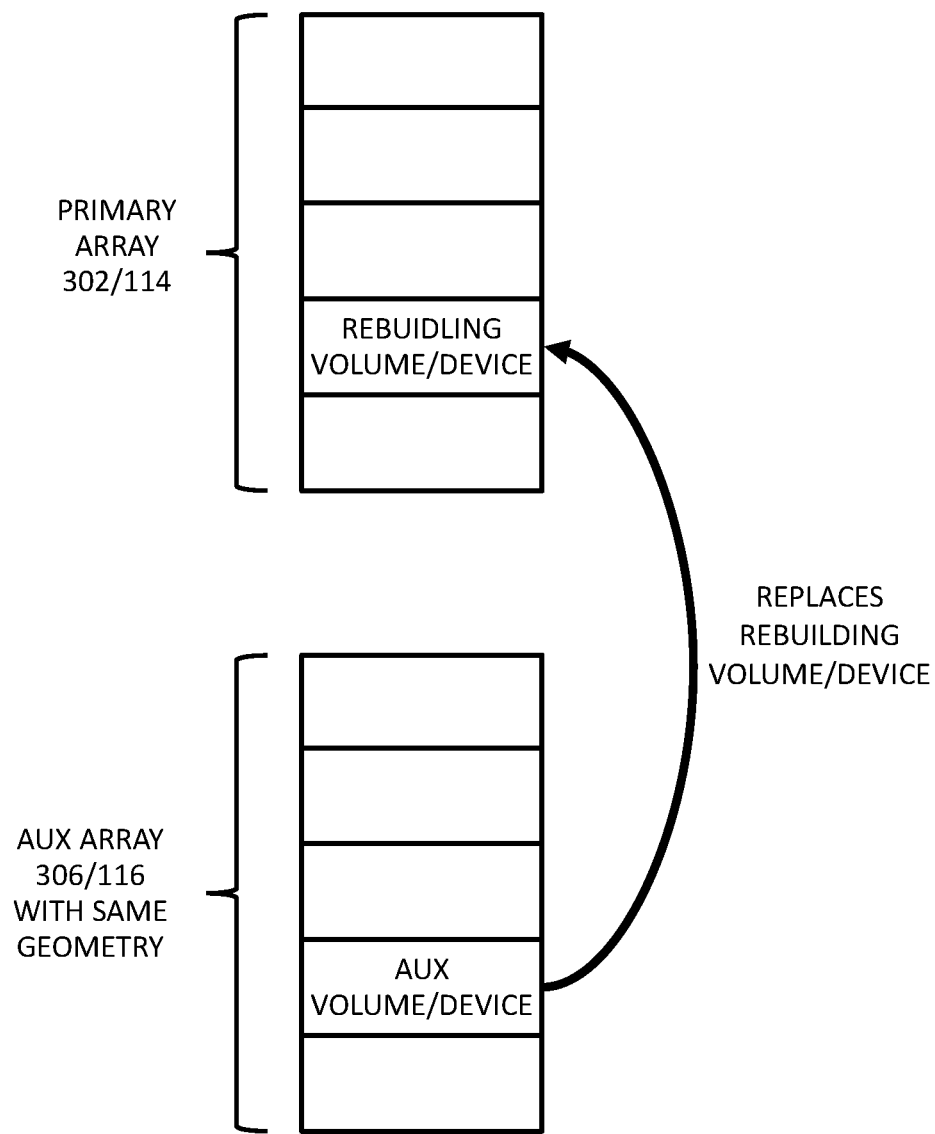

The example shown in FIG. 5F illustrates replacing a volume 302 or primary storage device 114 that is being rebuilt with a corresponding auxiliary volume 306 or auxiliary storage device 116. The volume 302 or primary storage device 114 is replaced by a replacement module 208 in response to an error detection module 204 detecting/determining an error in the volume 302 or primary storage device 114 and the volume 302 or primary storage device 114 is in the process of being rebuilt. Further, the replacement module 208 replaces the volume 302 or primary storage device 114 subsequent to a secondary backup module 206 requesting and receiving a mirrored copy of the data stored in the volume(s) 302 or primary storage device(s) 114 from a backup site 104.

Figure 5G:
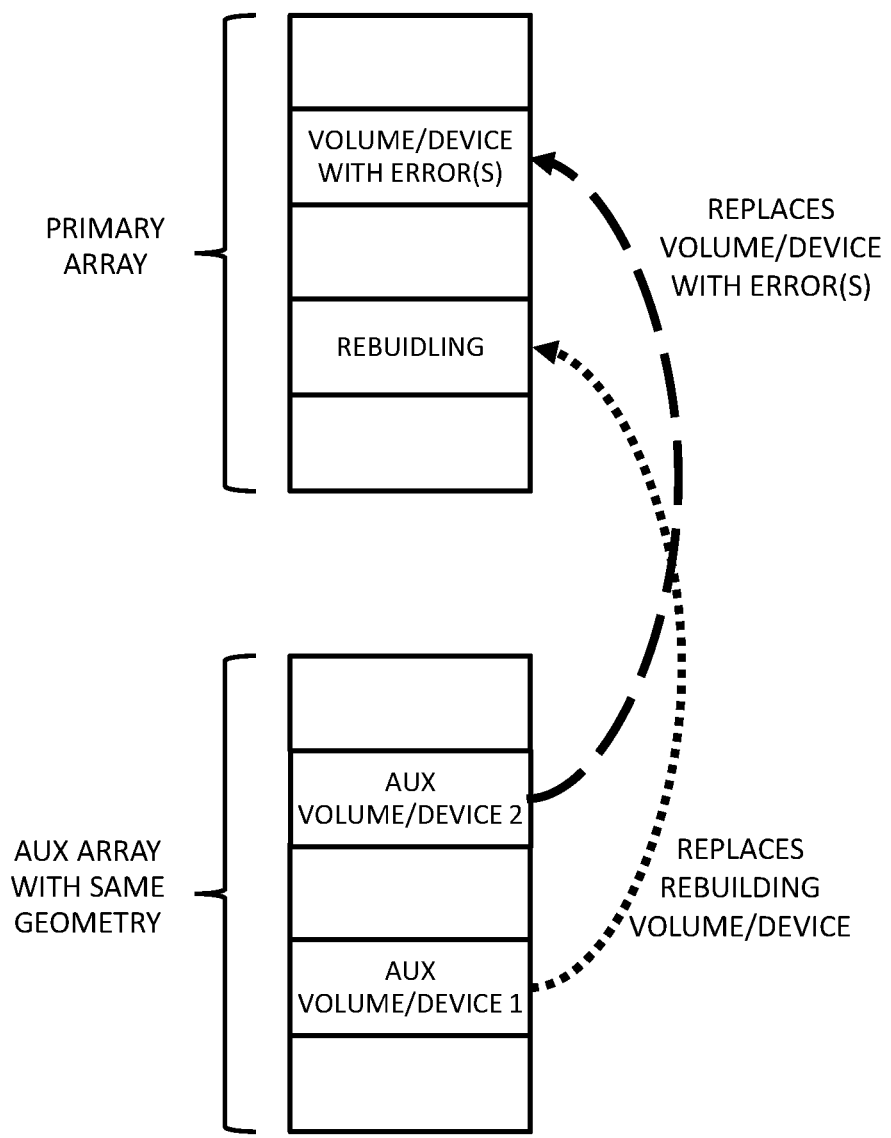

In FIG. 5G, a replacement module 208 replaces multiple volumes 302, multiple primary storage devices 114, or a volume 302 and a primary storage device 114 that are experiencing an error and/or is in the process of being rebuilt. The replacement module 208 replaces the multiple volumes 302, multiple primary storage devices 114, or the volume 302 and the primary storage device 114 with multiple auxiliary volumes 306, multiple auxiliary storage devices 116, or an auxiliary volume 306 and an auxiliary storage device 116, respectively, which are represented in FIG. 5G as AUX volume/device 1 and AUX volume/device 2. Further, the replacement module 208 can replace the volumes 302, primary storage devices 114, or volume 302 and primary storage device 114 in parallel or in series with one another.

Figure 5H:
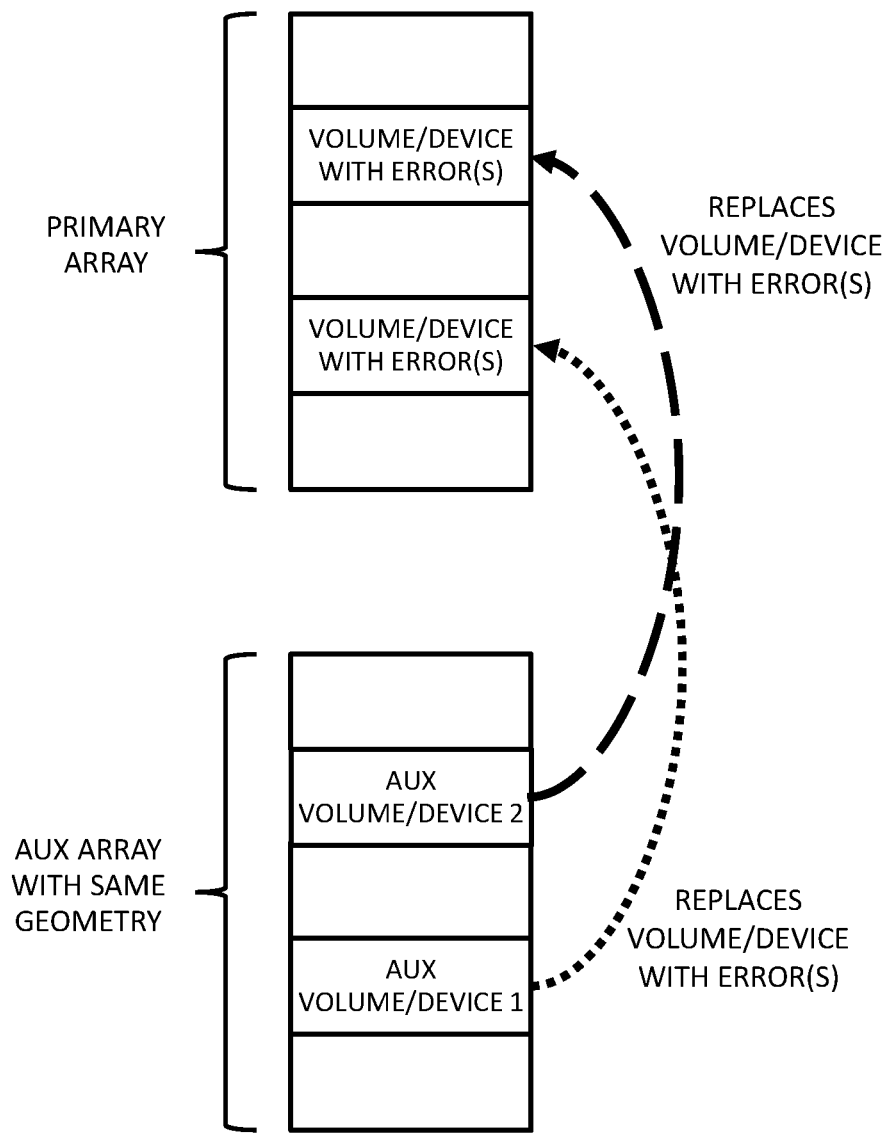

The example shown in FIG. 5H illustrates replacing multiple volumes 302, multiple primary storage devices 114, or a volume 302 and a primary storage device 114 that are each experiencing an error. The replacement module 208 replaces the multiple volumes 302, multiple primary storage devices 114, or the volume 302 and the primary storage device 114 with multiple auxiliary volumes 306, multiple auxiliary storage devices 116, or an auxiliary volume 306 and an auxiliary storage device 116, respectively, similar to the example illustrated in FIG. 5G.

Figure 5I:
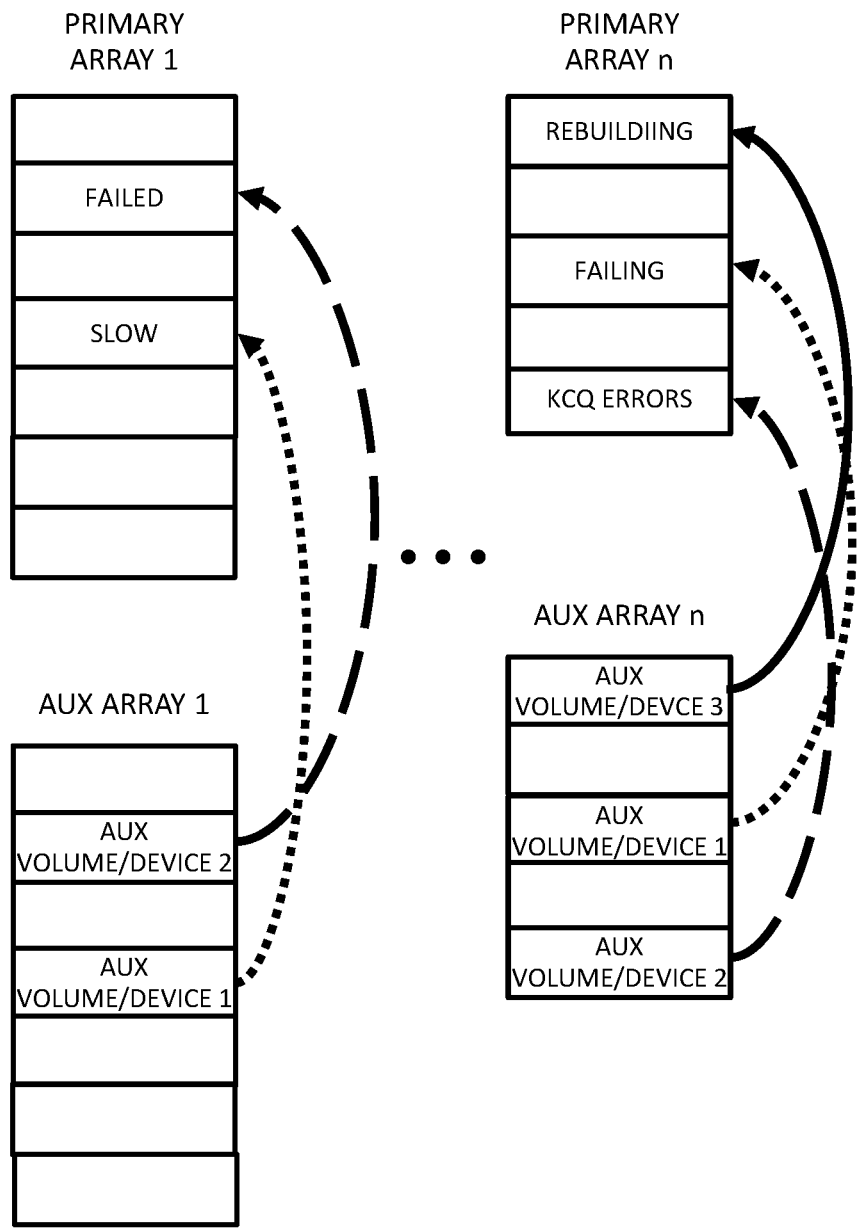

In FIG. 5I, a replacement module 208 can replace one or more volumes 302 and/or one or more primary storage devices 114 in multiple primary arrays (e.g., array 1 through array n) similar to the various embodiments discussed herein with reference to FIGS. 5A through 5H. Further, a replacement module 208 can perform replacement operations in multiple arrays in parallel and/or in series with respect to one another and/or with respect to the volumes 302 and/or primary storage devices 114 in each primary array.

For example, a replacement module 208 may perform replacement operations on primary array 1 and primary array n in parallel with respect to one another, perform the respective replacement operations for volumes 302 and/or storage devices 114 in array 1 in series with respect to one another, and perform the respective replacement operations for volumes 302 and/or storage devices 114 in array 1 in parallel with respect to one another. In another example, a replacement module 208 may perform replacement operations on primary array 1 and primary array n in series with respect to one another, perform the respective replacement operations for volumes 302 and/or storage devices 114 in array 1 in parallel with respect to one another, and perform the respective replacement operations for volumes 302 and/or storage devices 114 in array 1 in parallel with respect to one another. As can be appreciated, other examples including various combinations of replacement module(s) 208 performing replacement operations on multiple primary arrays in parallel and/or in series are possible and contemplated herein.

The various embodiments discussed above with reference to FIGS. 5A through 5I may provide several advantages and/or improvements over prior storage and/or recovery techniques. For instance, after a primary storage device 114 is replaced by an auxiliary device 116 and/or a volume 302 is replaced by an auxiliary storage volume 306, the amount of time to rebuild, recover, and/or repair a primary storage device 114 and/or volume 302 can be reduced, often significantly, compared to some conventional techniques that can experience a data loss situation, which advantages/ improvements can conserve time and/or various resources in the storage system 100.

Figure 6:
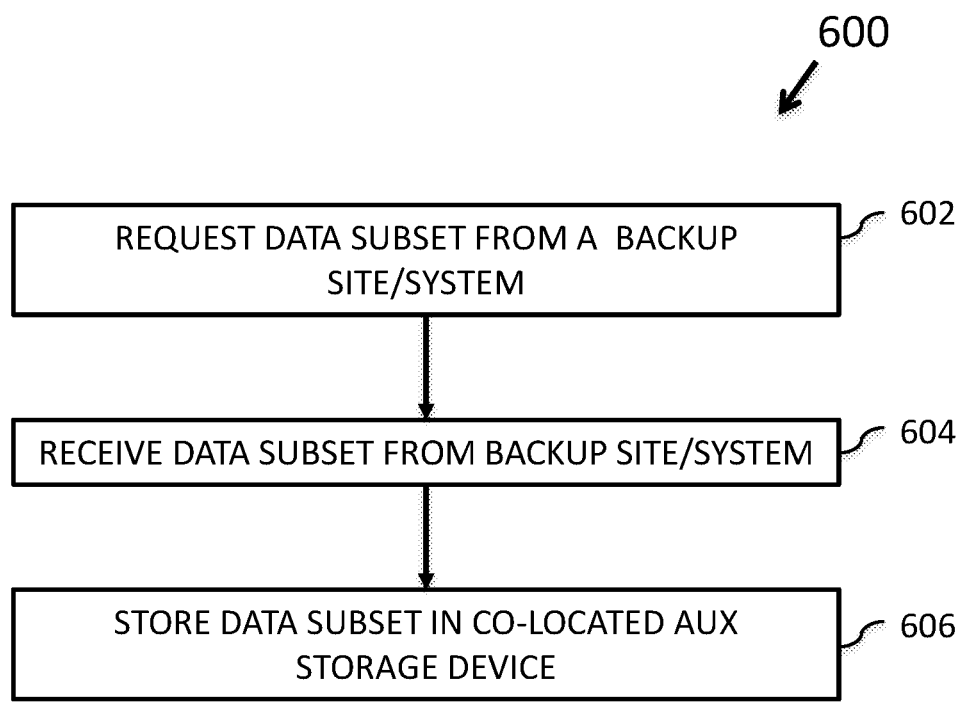
FIG. 6 is a schematic flow diagram of one embodiment of a method that can copy data to one or more auxiliary storage arrays co-located with one or more primary storage arrays from a backup site/system including mirrored data.

With reference to FIG. 6, FIG. 6 is a schematic flow diagram of one embodiment of a method 600 that can copy data to arrays of auxiliary storage volumes 306 and/or auxiliary storage devices 116 co-located with arrays of primary storage volumes 302 and/or primary storage devices 114 from a backup site 104 including mirrored data. At least in the illustrated embodiment, the method 600 begins by a processor 118 requesting a subset of mirrored data stored on a backup site 106 and/or system (block 602). The subset of mirrored data is a copy of the data stored in a volume 302 or primary storage device 114 (that includes the volume 302) that is experiencing an error and/or is in the process of being rebuilt, as discussed elsewhere herein.

Upon receipt of the data subset (block 604), the processor 118 stores the subset of data in a corresponding auxiliary storage volume 306 or auxiliary storage device 116 (that includes the corresponding auxiliary storage volume 306) (block 606). In various embodiments, the auxiliary storage volume 306 or auxiliary storage device 116 (that includes the auxiliary storage volume 306) includes the same geometry and/or topology as the volume 302 or primary storage device 114 that is experiencing the error and/or is in the process of being rebuilt, as discussed elsewhere herein.

Figure 7:
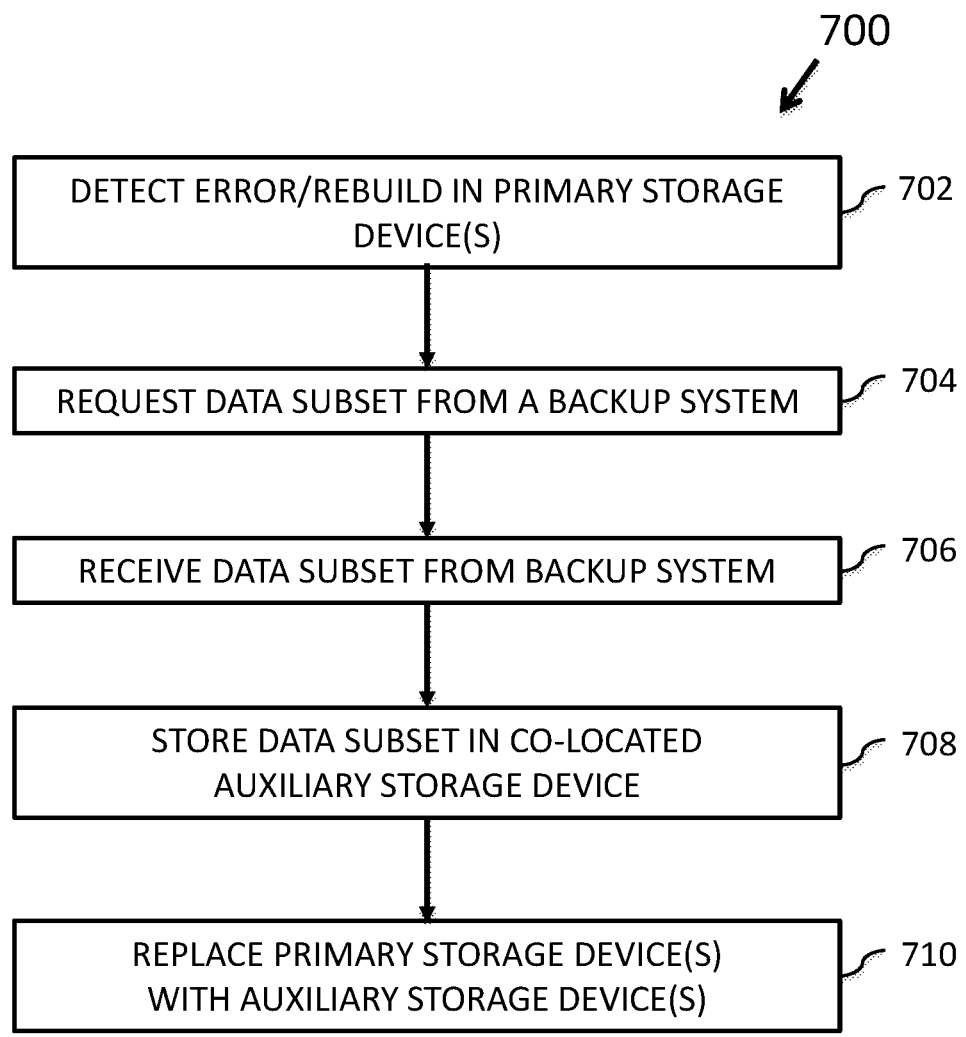
FIG. 7 is a schematic flow diagram of another embodiment of a method that can copy data to one or more auxiliary storage arrays co-located with one or more primary storage arrays from a backup site/system including mirrored data.

Referring to FIG. 7, FIG. 7 is a schematic flow diagram of another embodiment of a method 700 that can copy data to arrays of auxiliary storage volumes 306 and/or auxiliary storage devices 116 co-located with arrays of primary storage volumes 302 and/or primary storage devices 114 from a backup site 104 including mirrored data. At least in the illustrated embodiment, the method 700 begins by a processor 118 detecting an error and/or a rebuild process in one or more volumes 302 or primary storage devices 114 in one or more primary arrays (e.g., array 1 through array n in FIGS. 5H and 5I) (block 702).

In response to detecting the error(s) and/or rebuild process or processes, the processor 118 requests a subset of mirrored data stored on a backup site 106 and/or system (block 704). The subset(s) of mirrored data is/are a copy of the data stored in the volume(s) 302 and/or primary storage device(s) 114 (that can include the volume(s) 302) that is/are experiencing the error(s) and/or in the process/processes of being rebuilt, as discussed elsewhere herein.

Upon receipt of the data subset(s) (block 706), the processor 118 stores the subset(s) of data in the corresponding auxiliary storage volume(s) 306 or auxiliary storage device(s) 116 (that includes the corresponding auxiliary storage volume(s) 306) (block 708). In various embodiments, the auxiliary storage volume(s) 306 and/or auxiliary storage device(s) 116 (that includes the auxiliary storage volume(s) 306) include(s) the same geometry and/or topology as the volume(s) 302 and/or primary storage device(s) 114 that is/are experiencing the error(s) and/or in the process/processes of being rebuilt, as discussed elsewhere herein.

Subsequent to receiving the subset(s) of mirrored data from the backup site 104 and/or system, the processor 118 replaces the volume(s) 302 and/or primary storage device(s) 114 in the primary array(s) (block 710). The processor 118 can replace the volume(s) 302 and/or primary storage device(s) 114 in the primary array(s) with corresponding auxiliary volume(s) 306 and/or auxiliary storage devices 116 in any combination of parallel and/or series replacement operations, as discussed elsewhere herein.

The embodiments may be practiced in other specific forms. The described embodiments are to be considered in all respects only as illustrative and not restrictive. The scope of the technology is, therefore, indicated by the appended claims rather than by the foregoing description. All changes that come within the meaning and range of equivalency of the claims are to be embraced within their scope.

What is claim is:

1. A system, comprising:
an error detection module that detects errors in an array of primary storage devices storing a set of data on a primary site;
a secondary backup module that:
requests backup data for subsets of the data from a primary backup module mirrored on a secondary site in response to the error detection module detecting errors in the array of primary storage devices,
receives the backup data mirrored on the secondary site from the primary backup module, and
stores the backup data in an array of auxiliary storage devices on the primary site; and
a management module that:
manages the array of primary storage devices,
transmits the set of data on the primary site to the secondary site to create the backup data mirrored on the secondary site, and
utilizes the backup data stored in the array of auxiliary storage devices to restore data stored on a primary storage device experiencing an error,
wherein:
the backup data corresponds to the data stored on the primary storage device experiencing the error, and
at least a portion of said modules comprise one or more of a set of hardware circuits, a set of programmable hardware devices, and executable code stored on a set of computer-readable storage media.

2. The system of claim 1, wherein the primary site comprises:
a processor including the management module, the error detection module, and the secondary backup module.

3. The system of claim 2, wherein:
the secondary site comprises a secondary array of storage devices that mirror the set of data stored on the primary set of storage devices; and
the primary backup module is configured to:
manage the secondary array of storage devices, and
transmit the backup data to the secondary backup module in response to receiving, from the secondary backup module, a request for a subset of the data stored in a first storage device experiencing a first error.

4. The system of claim 1, wherein the array of auxiliary storage devices includes a same geometry as the array of primary storage devices.

5. The system of claim 4, wherein:
the error detection module identifies the primary storage device as experiencing the error; and
the secondary backup module stores the backup data on a second storage device in the array of auxiliary storage devices corresponding to the primary storage device in the array of primary storage devices.

6. The system of claim 5, wherein the processor further comprises a replacement module that replaces the primary storage device in the array of primary storage devices with the second storage device in the array of auxiliary storage devices in response to the subset of the data being stored in the second storage device.

7. The system of claim 1, wherein the primary backup module is located on a different site than the array of primary storage devices and the auxiliary array of storage devices.

8. The system of claim 1, wherein the auxiliary array of storage devices includes a same geometry as the array of primary storage devices.

9. The system of claim 8, wherein:
the error detection module identifies the primary storage device in the array of primary storage devices as experiencing the error; and
the secondary backup module stores the backup data on a second storage device in the auxiliary array of storage devices corresponding to the primary storage device in the array of primary storage devices.

10. The system of claim 9, further comprising:
a replacement module that replaces the primary storage device in the array of primary storage devices with the second storage device in the auxiliary array of storage devices in response to the backup data being stored in the second storage device.

11. A method comprising:
mirroring a set of data stored in an array of primary storage devices on a primary site to a backup system on a remote site;
requesting a subset of the data from the backup system mirroring the set of data on the remote site;
receiving, at the primary site, the subset of the data from the backup system;
storing the subset of the data in an array of auxiliary storage devices co-located with the array of primary storage devices on the primary site; and
in response to detecting an error in a first storage device of the array of primary storage devices, using a second storage device in the array of auxiliary storage devices storing the subset of the data on the primary site to restore the first storage device,
wherein the subset of the data corresponds to data stored on the first storage device.

12. The method of claim 11, wherein the array of primary storage devices and the array of auxiliary storage devices include a same geometry.

13. The method of claim 12, wherein the second storage device of the array of auxiliary storage devices corresponds to the first storage device of the array of primary storage devices.

14. The method of claim 13, further comprising:
replacing the first storage device in the array of primary storage devices with the second storage device from the auxiliary array of storage devices.

15. A computer program product comprising a computer-readable storage medium including program instructions embodied therewith, the program instructions executable by a processor to cause the processor to:
mirror a set of data stored in an array of primary storage devices on a primary site to a backup system on a remote site;
request a subset of the data from the backup system mirroring the set of data on the remote site;
receive, at the primary site, the subset of the data from the backup system;
store the subset of the data in an array of auxiliary storage devices co-located with the array of primary storage devices on the primary site; and
in response to detecting an error in a first storage device of the array of primary storage devices, utilize a second storage device in the array of auxiliary storage devices storing the subset of the data on the primary site to restore the first storage device,
wherein the subset of the data corresponds to data stored on the first storage device.

16. The computer program product of claim 15, wherein the array of primary storage devices and the array of auxiliary storage devices include a same geometry.

17. The computer program product of claim 16, wherein the second storage device of the array of auxiliary storage devices corresponds to the first storage device of the array of primary storage devices.

18. The computer program product of claim 17, further comprising program instructions that further cause the processor to:
replace the first storage device in the array of primary storage devices with the second storage device from the auxiliary array of storage devices.

* * * * *